United States Patent
Oh

(10) Patent No.: US 8,910,655 B2
(45) Date of Patent: Dec. 16, 2014

(54) GAS VALVE HAVING AUTOMATICALLY BLOCKING MEANS

(71) Applicant: Kofulso Co., Ltd., Incheon-si (KR)

(72) Inventor: Seung-il Oh, Seoul (KR)

(73) Assignee: Kofulso Co., Ltd., Incheon-si (KR)

( * ) Notice: Subject to any disclaimer, the term of this patent is extended or adjusted under 35 U.S.C. 154(b) by 85 days.

(21) Appl. No.: 13/857,284

(22) Filed: Apr. 5, 2013

(65) Prior Publication Data

US 2014/0299209 A1 Oct. 9, 2014

(51) Int. Cl.
*F16K 17/00* (2006.01)
*F16K 5/06* (2006.01)
*F16K 15/02* (2006.01)

(52) U.S. Cl.
CPC ............... *F16K 15/026* (2013.01); *F16K 5/06* (2013.01)
USPC ...................... 137/460; 137/522; 137/614.19

(58) Field of Classification Search
USPC ......... 137/460, 459, 517, 498, 522, 523, 614, 137/614.19, 462
See application file for complete search history.

(56) References Cited

U.S. PATENT DOCUMENTS

| | | | | |
|---|---|---|---|---|
| 1,153,850 A | * | 9/1915 | Meier | 137/460 |
| 1,179,225 A | * | 4/1916 | Sanford | 137/459 |
| 2,522,406 A | * | 9/1950 | Smith | 137/512.3 |
| 2,926,690 A | * | 3/1960 | Martin | 137/460 |
| 3,540,469 A | * | 11/1970 | Ward | 137/512.1 |
| 3,612,461 A | | 10/1971 | Brown | |
| 3,652,780 A | | 3/1972 | Wilson | |
| 3,794,077 A | * | 2/1974 | Fanshier | 137/513.3 |
| 3,874,035 A | | 4/1975 | Schuplin | |
| 4,135,692 A | | 1/1979 | Ferguson | |
| 4,436,111 A | * | 3/1984 | Gold et al. | 137/498 |
| 4,456,029 A | * | 6/1984 | McCrum | 137/498 |
| 4,465,093 A | * | 8/1984 | Gold et al. | 137/498 |
| 4,699,166 A | * | 10/1987 | Gold et al. | 137/2 |
| 4,717,099 A | | 1/1988 | Hubbard | |
| 4,723,749 A | | 2/1988 | Carraro et al. | |
| 4,934,405 A | * | 6/1990 | Brownfield | 137/517 |
| 5,293,898 A | * | 3/1994 | Masloff | 137/517 |
| 5,595,363 A | | 1/1997 | De Leebeeck | |
| 5,667,181 A | | 9/1997 | van Leeuwen et al. | |
| 6,089,474 A | * | 7/2000 | Marino | 239/570 |
| 6,237,633 B1 | * | 5/2001 | Nimberger | 137/614.2 |
| 6,260,810 B1 | | 7/2001 | Choi | |
| 6,345,800 B1 | | 2/2002 | Herst et al. | |
| 6,554,231 B2 | | 4/2003 | Choi | |
| 6,811,130 B1 | | 11/2004 | Oh | |
| 6,814,101 B2 | * | 11/2004 | Flauzac | 137/614.17 |
| 7,296,594 B1 | * | 11/2007 | Phanco | 137/599.18 |
| 7,427,051 B2 | | 9/2008 | Oh | |
| 7,591,282 B1 | * | 9/2009 | Achterman | 137/498 |
| 8,020,582 B2 | * | 9/2011 | Lea-Wilson et al. | 137/460 |
| 8,365,769 B2 | * | 2/2013 | Nimberger | 137/614.06 |
| 2011/0232779 A1 | * | 9/2011 | Oh | 137/485 |

* cited by examiner

*Primary Examiner* — John Rivell
*Assistant Examiner* — Umashankar Venkatesan
(74) *Attorney, Agent, or Firm* — Jacobson Holman Hershkovitz, PLLC.

(57) ABSTRACT

Disclosed therein is a gas valve having automatically blocking means, which is mounted at an inlet side of a valve body having a ball valve so that the gas valve does not need additional blocking means for blocking a gas pipe at the time of a gas leak, and which returns a blocking member to its original position when the valve is opened after coping with the gas leak at the leaked portion, thereby making maintenance easy.

2 Claims, 6 Drawing Sheets

GAS VALVE HAVING AUTOMATICALLY BLOCKING MEANS

BACKGROUND OF THE INVENTION

1. Field of the Invention

The present invention relates to a gas valve having automatically blocking means, and more particularly, to a gas valve having automatically blocking means, which can automatically block a supply of gas according to a change in pressure at the time of a gas leak.

2. Background Art

In general, a gas valve is mounted in the middle of a gas pipe and serves just to control a supply of gas, and hence, gas blocking means must be mounted at the gas pipe in order to automatically block the supply of gas at the time of a gas leak.

FIG. 1 shows means for blocking a supply of gas at the time of a gas leak according to a prior art.

As shown in FIG. 1, a weight 3 is mounted inside a case 5 by means of wing portions 4 having holes so as to block an inlet 1 and an outlet 2 according to gas pressure. In a normal condition, the weight 3 is located at a position to open the inlet 1 and the outlet 2, but when the gas pressure of the outlet side lowers due to a gas leak, the weight 3 blocks the outlet 1.

However, such an automatically blocking means for the gas valve according to the prior art has a problem in that it requires an auxiliary gas pipe 6 mounted at the outlet 2 for supplying gas and an electromagnet 7 mounted at the inlet 1 in order to return the weight 3 to its original position after coping with the gas leak.

In the meantime, a method of preventing a gas leak by an electromagnetic valve operated by a sensing signal of a gas sensor has been proposed, but the preventing method has a problem in that the gas sensor cannot sense a gas microleakage or cannot sense the gas leak during the blackout.

SUMMARY OF THE INVENTION

Accordingly, the present invention has been made to solve the above-mentioned problems occurring in the prior arts, and it is an object of the present invention to provide a gas valve having automatically blocking means, which is mounted at an inlet side of a valve body having a ball valve so that the gas valve does not need additional blocking means for blocking a gas pipe at the time of a gas leak, and which returns a blocking member to its original position when the valve is opened after coping with the gas leak at the leaked portion, thereby making maintenance easy.

To achieve the above objects, the present invention provides a gas valve having automatically blocking means including: a support member having a cylindrical portion, wing portions protruding from the cylindrical portion, supporting portions intersecting at ends of the wing portions in a criss-cross form, and a through hole formed at the center of the supporting portions; a blocking member having a shaft portion inserted into the through hole, an opening and closing portion formed integrally with the shaft portion in such a way as to be restricted in position by the supporting portions, and a tip portion protruding from the center of the opening and closing portion; a spring fit onto the shaft portion in such a way as not to be separated from the shaft portion owing to a head portion formed on the shaft portion; a main body having a fixing hole into which the cylindrical portion coated with an adhesive is inserted, a passage formed to be opened and closed by the opening and closing portion, and a spiral portion formed on an outer circumferential portion thereof; a valve body having an inlet adapted to insert the main body thereinto; and a ball valve mounted in the valve body and positioned to push the tip portion of the opening and closing portion which blocks the passage when it moves to a closed position.

As described above, the gas valve having the automatically blocking means according to the present invention does not need additional blocking means for blocking a gas pipe at the time of a gas leak because the automatically blocking means is mounted at the inlet side of the valve body having the ball valve. Moreover, the gas valve having the automatically blocking means returns the blocking member to its original position when the valve is opened after coping with the gas leak at the leaked portion, thereby making maintenance easy.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
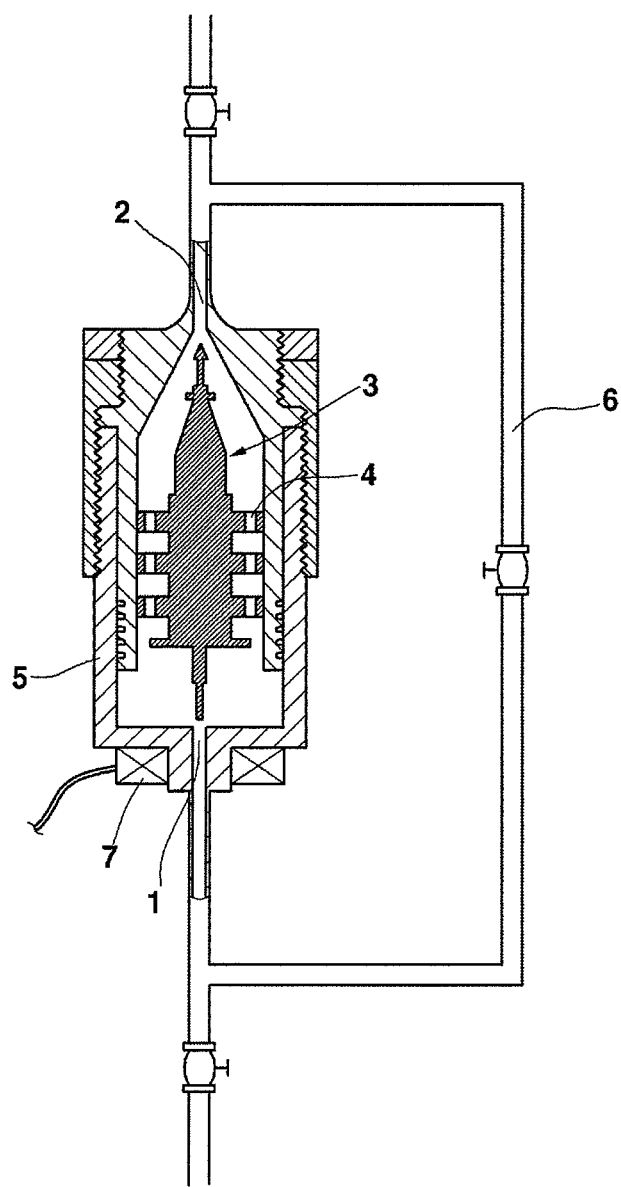
FIG. 1 is a sectional view showing automatically blocking means according to a prior art.
Figure 2:
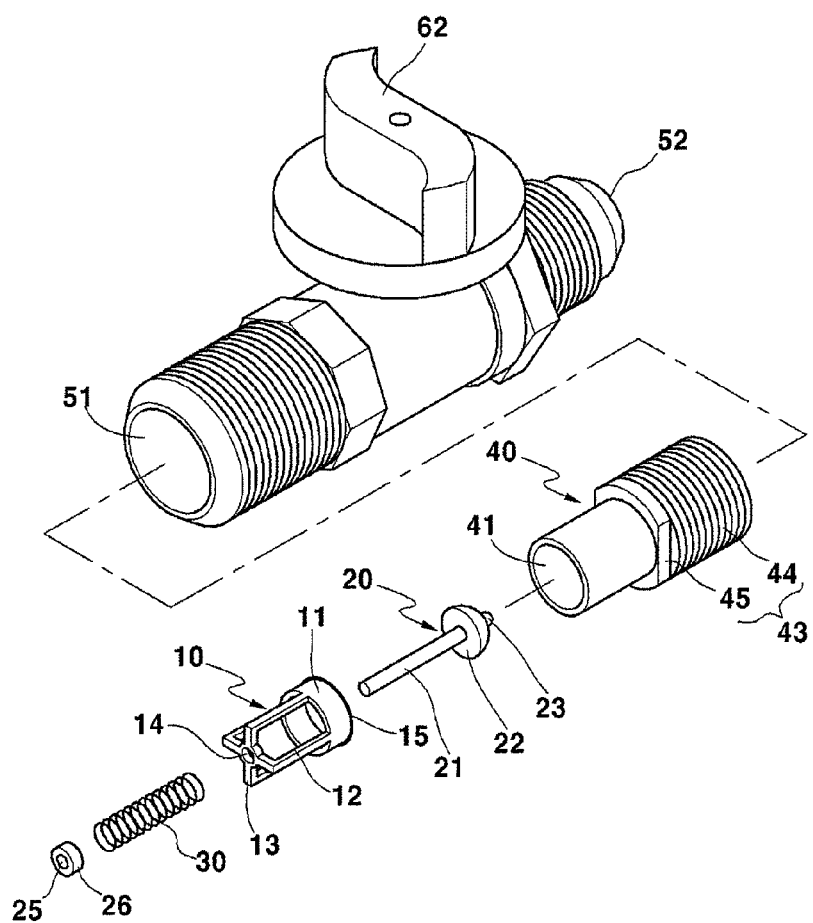
FIG. 2 is an exploded perspective view of a gas valve having automatically blocking means according to the present invention.

As shown in FIG. 2, a gas valve according to the present invention includes a support member 10, a blocking member 20, a spring 30, a main body 40, and a valve body 50.

Figure 3:
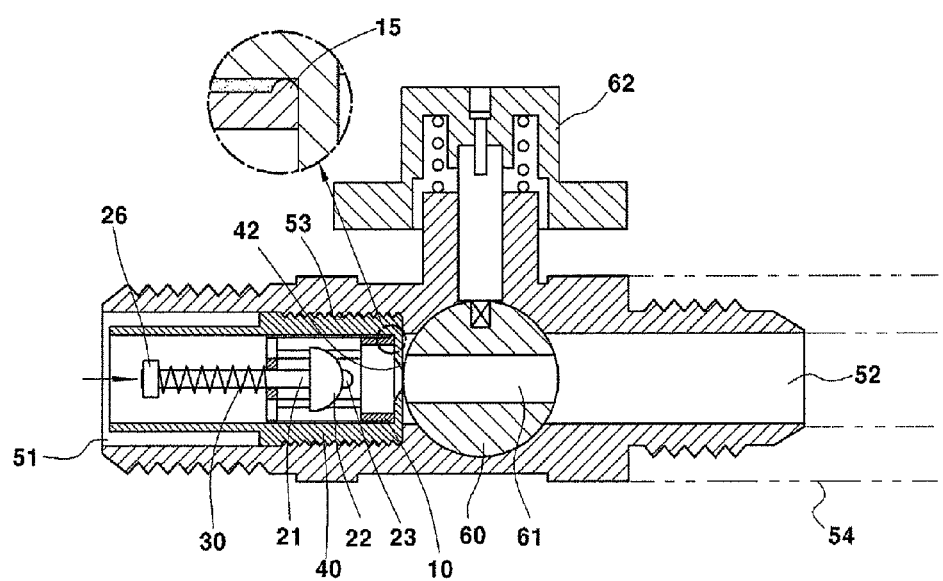
FIG. 3 is a sectional view showing a state where gas is normally supplied in the present invention.

FIG. 3 is a sectional view of the gas valve of the present invention in a state where gas is supplied normally.

The support member 10 includes a cylindrical portion 11, wing portions 12 protruding from the cylindrical portion 11, supporting portions 13 intersecting at an end of the wing portions 12 in a criss-cross form, and a through hole 14 formed at the center of the supporting portions 13.

The blocking member 20 includes a shaft portion 21 inserted into the through hole 14, an opening and closing portion 22 formed integrally with the shaft portion 21 in such a way as to be restricted in position by the supporting portions 13, and a tip portion 23 protruding from the center of the opening and closing portion 22.

The blocking member 20 is joined to the support member 10 through a process of inserting the shaft portion 21 into the through hole 14, fitting the spring 30 onto the protruding shaft portion 21 through the criss-cross portion of the supporting portion 13, and forming a head portion 24 on the shaft portion 21. The head portion 24 is formed by a method of riveting the end of the shaft portion 21 to expand the end of the shaft portion 21 or a method of fitting a joining hole 25 of a member 26, which is larger in diameter than the spring 30, onto the shaft portion 21 and bonding the member 26 to the joining hole 25 with an adhesive. In this instance, the spring 30 is joined in a state where elasticity for pushing the head portion 21 does not work.

The main body 40 on which the blocking member 20 is mounted includes a fixing hole 41 to which the cylindrical portion 11 coated with the adhesive is inserted, and a passage 42 formed in front of the fixing hole 41 in such a way as to be opened and closed by the opening and closing portion 22.

It is preferable that a fine protrusion 15 is formed at a rim portion of the cylindrical portion 11 not to be stained with an adhesive when the cylindrical portion 11 is inserted into the fixing hole 41.

Figure 6:
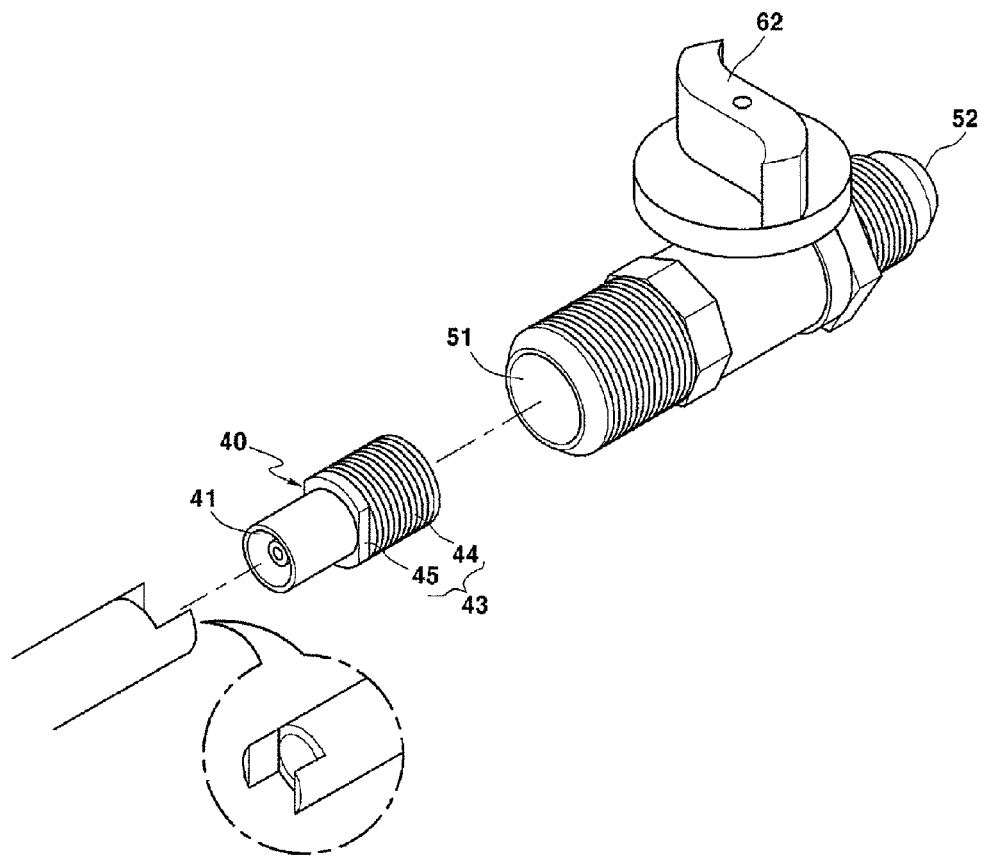
FIG. 6 is an exemplary view showing a tool for joining a main body of the present invention to an inlet.

On an outer circumferential portion 43 of the main body 40 in which the fixing hole 41 and the passage 42 are formed, a spiral portion 44, which is screw-coupled with a spiral hole 53 of an inlet 51, and a cut portion 45 are formed. The cut portion 45 may be rotated in a state where a tool for joining the main body 40 to the spiral hole 53 is fit to the cut portion 45 as shown in FIG. 6 in order to join the main body 40 to the spiral hole 53.

The valve body 50 has the inlet 51 to which the main body 40 is inserted. When the main body 40 is inserted into the inlet 51, a ball valve 60 mounted in the valve body 50 is mounted at a position where it pushes the tip portion 23 of the opening and closing portion 22 which blocks the passage 42 while moving to a closed position so as to return the tip portion 23 to its original state.

The ball valve 60 is formed in a globular shape in such a way as to be rotated by a hand-grip 62, so that the through hole 61 is communicated with the inlet 51 and the outlet 52 or blocked from the inlet 51 and outlet 52 according to the rotated position. In other words, in the state where the through hole 61 is communicated with the inlet 51, even though the opening and closing portion 22 blocks the passage 42, the tip portion 23 is located at the through hole 61. In the above state, when the hand-grip 62 is rotated, the tip portion 23 mounted close to the ball valve 60 is pushed.

When the hand-grip 62 is located at a locking position, the inlet 51 and the outlet 52 are blocked by the ball valve 60.

When the hand-grip 62 is rotated to an opening position, the ball valve 60 is rotated, so that the through hole 61 is communicated with the inlet 51 and the outlet 52 and gas of the inlet 51 is supplied to the outlet 52 through a space between the supporting portions 13 and through the passage 42. In this instance, because gas pressure acts not only on the opening and closing portion 22 but also on the outlet side, as shown in FIG. 3, the passage 42 is not blocked by elasticity of the spring 30.

Figure 4:
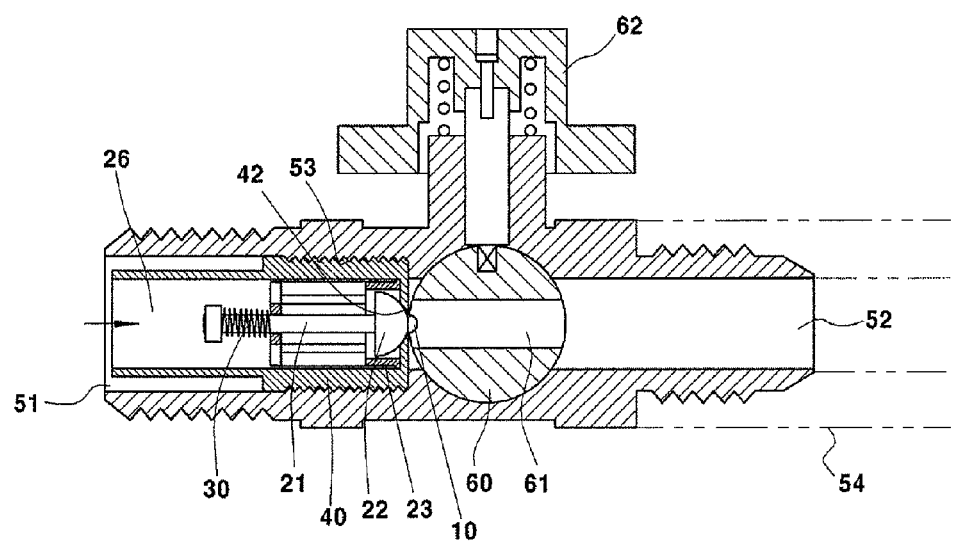
FIG. 4 is a sectional view showing a state where a blocking member according to the present invention blocks a passage.

As described above, in a state where the ball valve 60 of the valve body 50 is opened so that gas is normally used, when gas is leaked from a gas pipe 54, pressure of the outlet 52 is suddenly decreased, and as shown in FIG. 4, the opening and closing portion 22 blocks the passage 42 due to the change of gas pressure. In this instance, the spring 30 is compressed, and the shaft portion 21 is supported by the through hole 14.

When the opening and closing portion 22 blocks the passage 42, because gas supply is stopped, a user recognizes a gas leak, and hence, can take measures in a safe condition.

Figure 5:
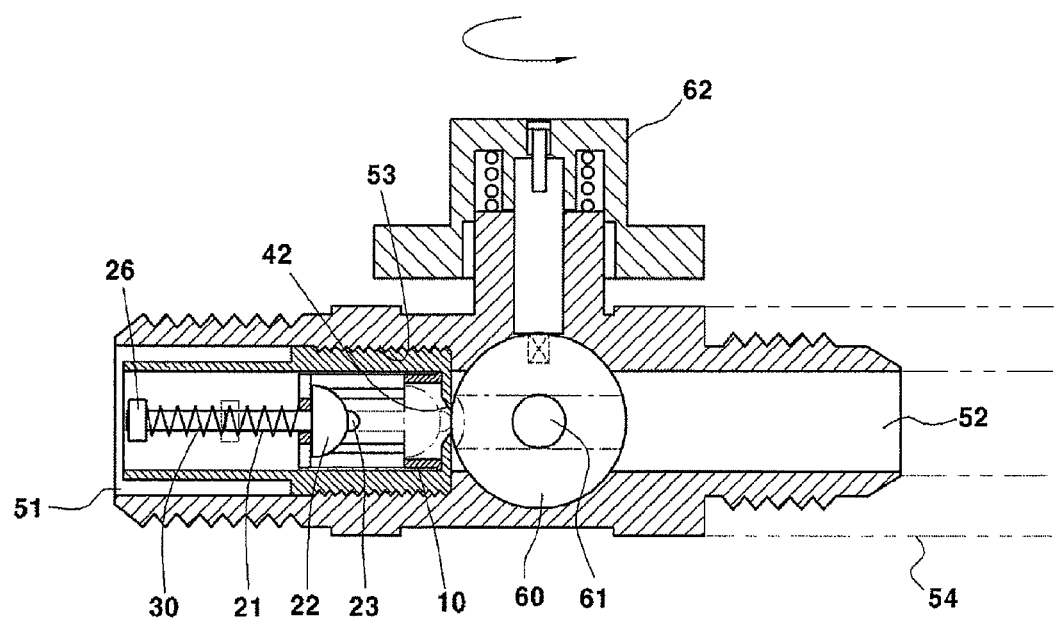
FIG. 5 is a sectional view showing a state where the blocking member is restored.

In the state where gas supply is stopped by the blocking member 20, when the hand-grip 62 is rotated to the closed position, a globular surface of the ball valve 60 pushes the tip portion 23 to thereby open the passage 42, so that gas is supplied to the outlet 52 through the passage 42, and then, the blocking member 20 moves to a position illustrated in FIG. 5 by a restoring force of the spring 30.

That is, the gas valve according to the present invention allows the user to easily carry out a safety inspection on the blocking means because the blocking member 20 can be returned to a normal position just when the user rotates the hand-grip 62 to the closed position.

In a normal condition that a difference in gas pressure between the inlet and the outlet of the valve is not large, the tip portion is located at a position spaced apart from the passage by elasticity of the spring, but when gas pressure of the outlet side is suddenly reduced due to the gas leak, the blocking member blocks the passage. As described above, the gas valve according to the present invention is easy to construct and maintain because the means for blocking gas at the time of the gas leak is mounted on the gas valve, and allows the user to conveniently and periodically carry out the safety inspection on the blocking means because the blocking member is returned to the normal condition when the user closes the valve after carrying out the measures to the gas leak.

While the present invention has been particularly shown and described with reference to the preferable embodiment thereof, it will be understood by those of ordinary skill in the art that the present invention is not limited to the above embodiment and various changes may be made therein without departing from the technical idea of the present invention.

What is claimed is:

1. A gas valve having automatically blocking means comprising:
    a support member having a cylindrical portion, wing portions protruding from the cylindrical portion, supporting portions intersecting at ends of the wing portions in a criss-cross form, and a through hole formed at the center of the supporting portions;
    a blocking member having a shaft portion inserted into the through hole, an opening and closing portion formed integrally with the shaft portion in such a way as to be restricted in position by the supporting portions, and a tip portion protruding from the center of the opening and closing portion;
    a spring fit onto the shaft portion in such a way as not to be separated from the shaft portion owing to a head portion formed on the shaft portion;
    a main body having a fixing hole into which the cylindrical portion coated with an adhesive is inserted, a passage formed in front of the fixing hole in such a way as to be opened and closed by the opening and closing portion, and a spiral portion formed on an outer circumferential portion thereof;
    a valve body having an inlet adapted to insert the main body thereinto and a spiral hole formed in the inlet in such a manner that the spiral portion is joined to the spiral hole; and
    a ball valve mounted in the valve body and positioned to push the tip portion of the opening and closing portion which blocks the passage when it moves to a closed position.

2. The gas valve having automatically blocking means according to claim 1, wherein a cut portion is formed on the outer circumferential portion of the main body so that a tool is fit on the cut portion so as to rotate the main body.

* * * * *